(12) United States Patent
Westhoff et al.

(10) Patent No.: US 6,406,025 B1
(45) Date of Patent: Jun. 18, 2002

(54) GASKET AND METHOD FOR FABRICATION AND USE WITH CORRUGATED PIPE

(75) Inventors: James A. Westhoff, Langhorne; James A. Kelly, Upper Black Eddy, both of PA (US); William C. Andrick, Uniontown, OH (US)

(73) Assignee: Poly-Tec Products, Inc., Tullytown, PA (US)

( * ) Notice: Subject to any disclaimer, the term of this patent is extended or adjusted under 35 U.S.C. 154(b) by 0 days.

(21) Appl. No.: 09/778,321

(22) Filed: Feb. 7, 2001

(51) Int. Cl.[7] .................................................. F16J 15/02
(52) U.S. Cl. ........................ 277/314; 277/606; 277/607; 277/616
(58) Field of Search ................................ 277/314, 604, 277/606, 607, 616; 285/903

(56) References Cited

U.S. PATENT DOCUMENTS

| | | | |
|---|---|---|---|
| 4,103,901 A | * | 8/1978 | Ditcher |
| 5,129,684 A | * | 7/1992 | Lawrence et al. |
| 5,180,196 A | * | 1/1993 | Skinner |
| 5,286,040 A | * | 2/1994 | Gavin |
| 5,626,346 A | * | 5/1997 | Gavin |
| 5,711,536 A | * | 1/1998 | Meyers |

OTHER PUBLICATIONS 2 pages from the NPC website, Oct. 2, 2000.

* cited by examiner

Primary Examiner—Anthony Knight
Assistant Examiner—John L. Beres
(74) Attorney, Agent, or Firm—Volpe and Koenig, P.C.

(57) ABSTRACT

A resilient compressible gasket having an embedment portion, a pipe engaging portion and a intermediate "radius" portion integral with the embedment and pipe engaging portions. The gasket assumes a "pleated" configuration when in the operative position, the pipe engaging portion extending through the embedment portion, yielding a gasket which compensates for deviation of the pipe from a nominal horizontal alignment without any reduction in the water-tight seal provided by the gasket. The gasket is sized to provide for easy insertion of a corrugated pipe into the pipe engaging portion while providing an excellent water-tight seal when clamped into position about one or more annular recesses and peaks of the corrugated pipe. Another embodiment of the gasket is designed to be secured to a cored or performed opening in a cast member through the use of an expansion-type clamping assembly. The free end of the pipe engaging portion is preferably provided with a radially outwardly directed flange which greatly facilitates alignment of the pipe engaging portion with an annular recess (or an annular peak) of a corrugated pipe.

39 Claims, 11 Drawing Sheets

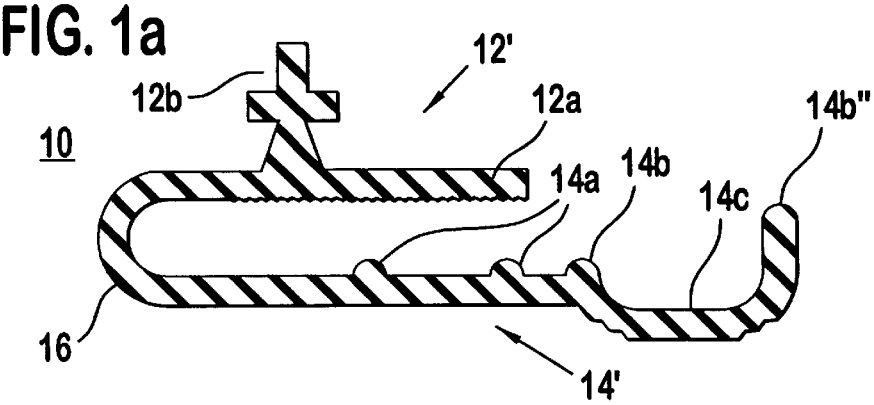
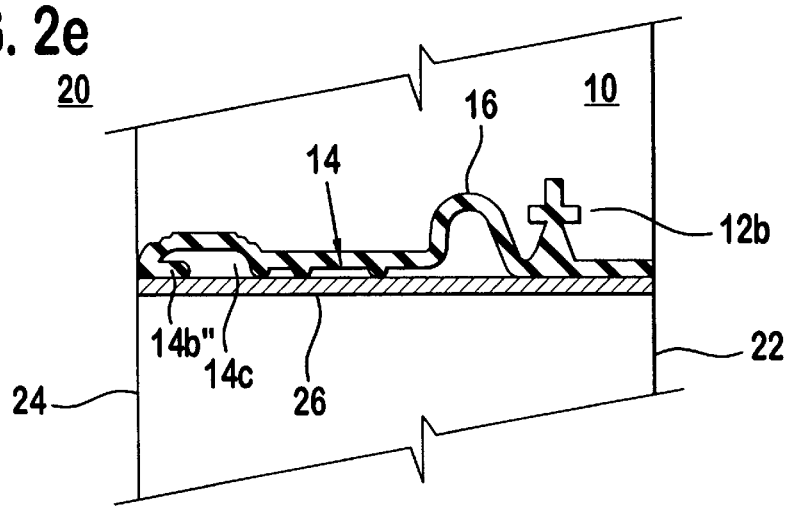
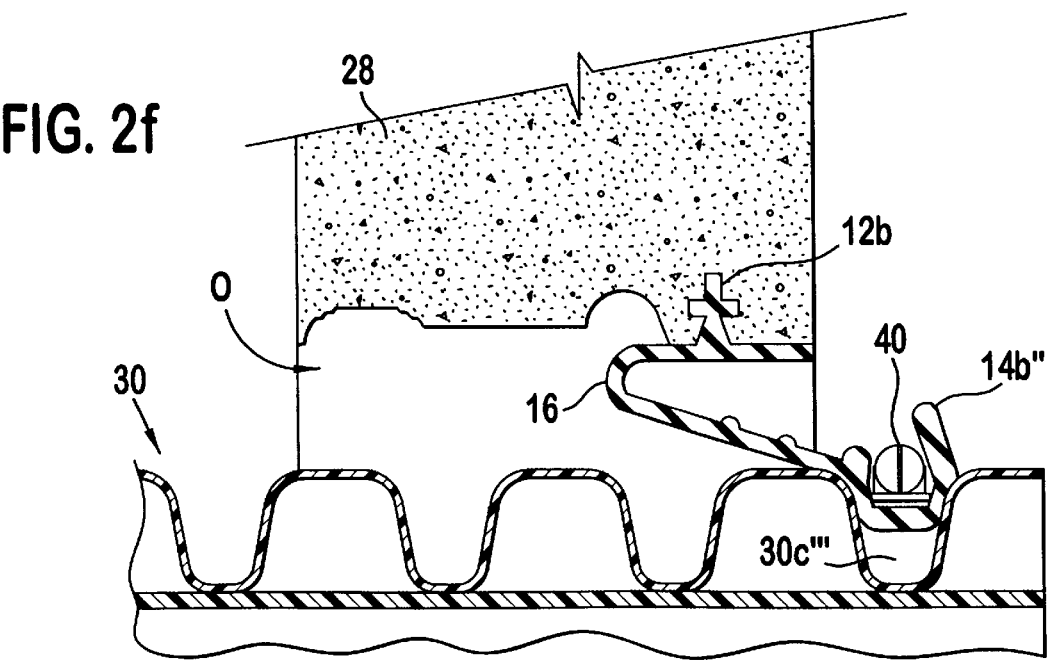

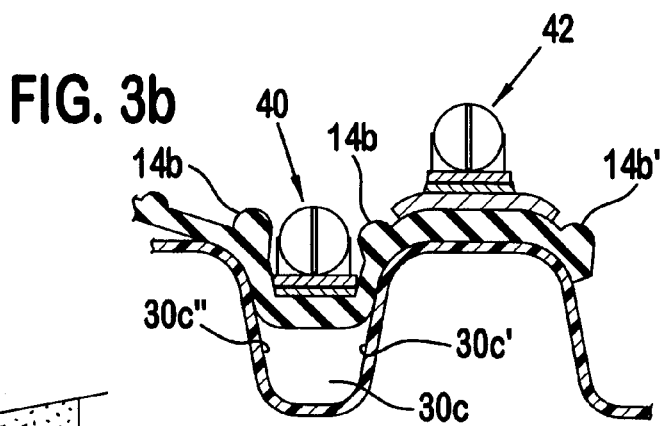
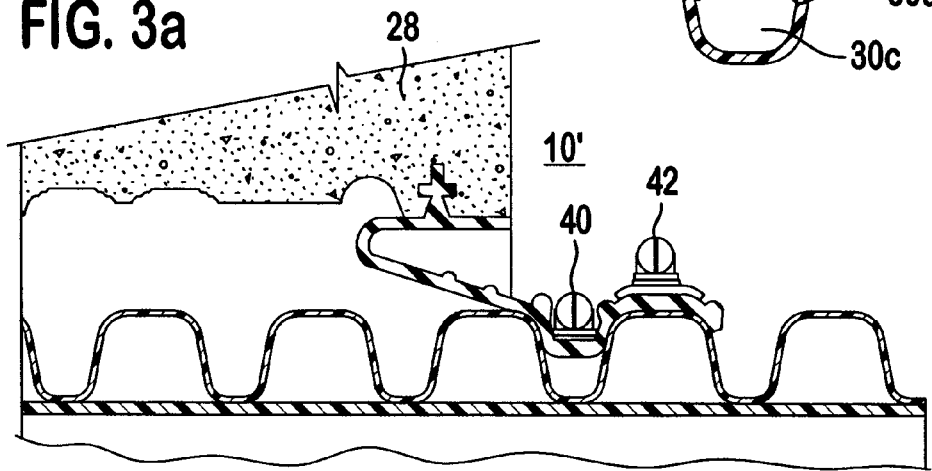
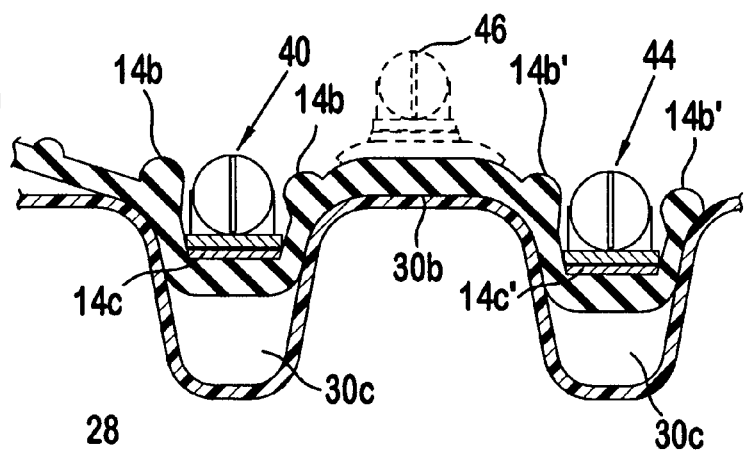
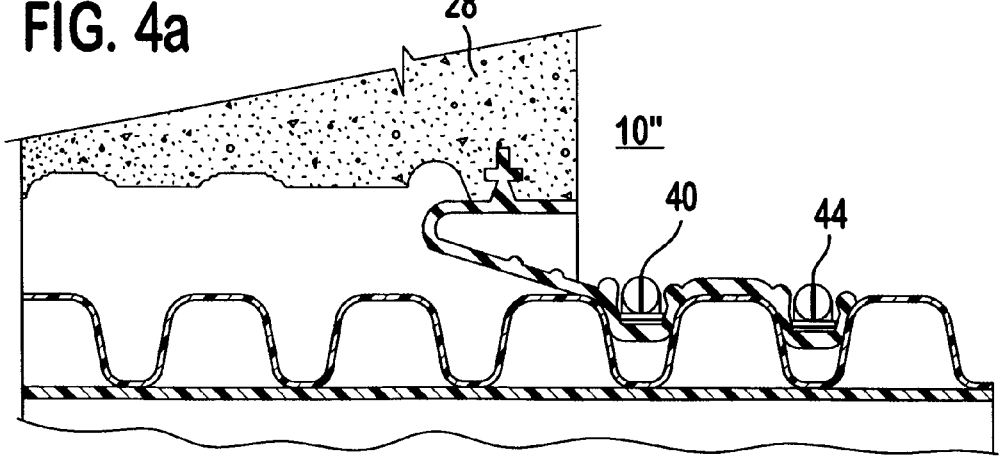

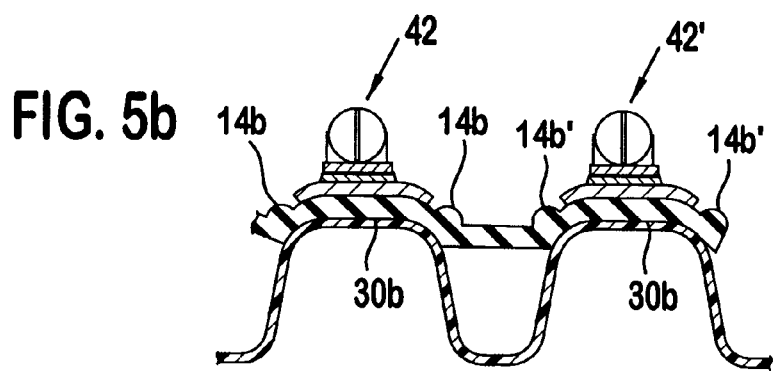
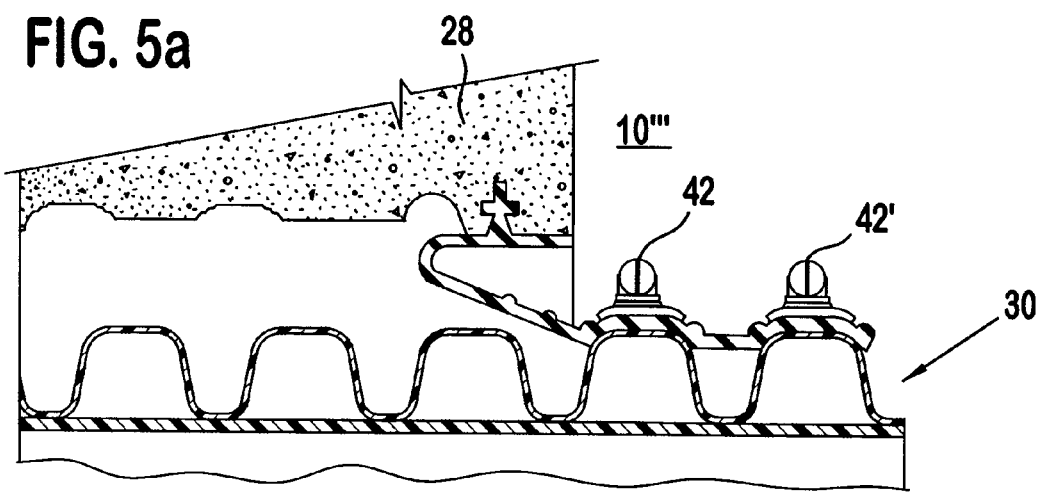
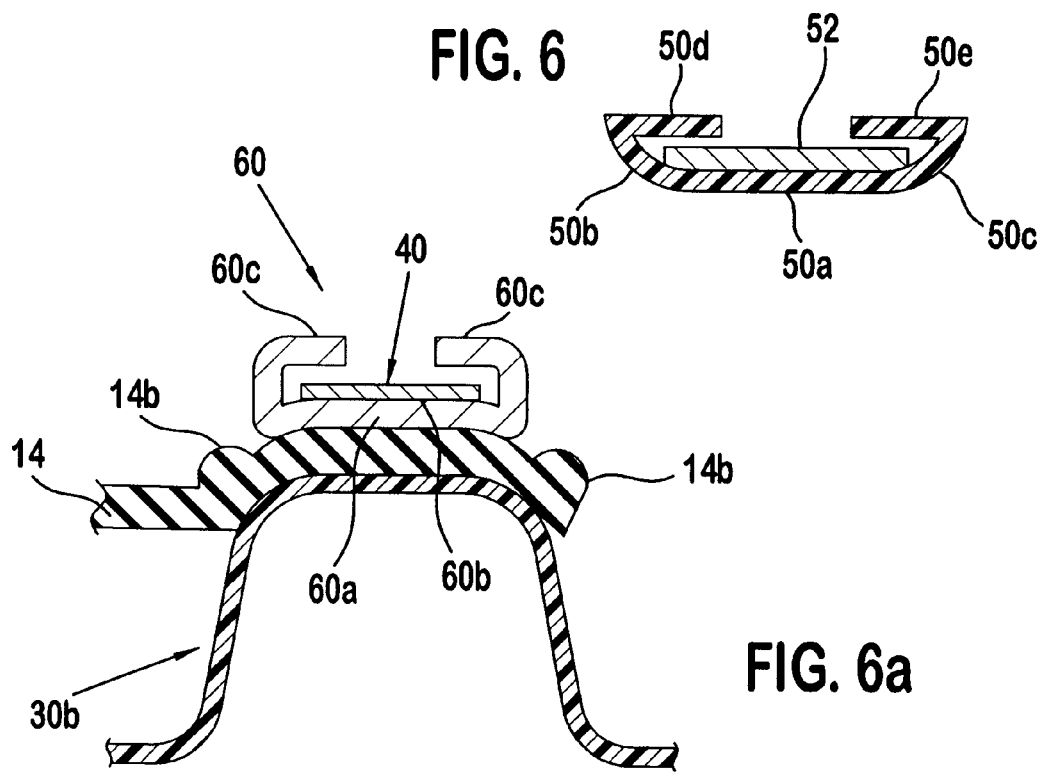

15"

30"

GASKET AND METHOD FOR FABRICATION AND USE WITH CORRUGATED PIPE

BACKGROUND

The present invention relates to gaskets for use in providing a liquid-tight seal between an opening in a sidewalk and a pipe and more particularly to a gasket for providing an excellent liquid-tight seal with a corrugated pipe and which is easy to install and use.

SUMMARY

Gaskets have been typically utilized for providing a liquid-tight seal between a sidewalk opening, for example, an opening provided in a cast member employed in septic, storm water or waste water systems, and a pipe extending into the opening.

Such gaskets are typically resilient, annular-shaped, rubber or rubber-like members having an embedment portion which is embedded in the sidewalk opening of a cast member when the member having the sidewalk opening is cast, and a pipe engaging portion for surrounding and engaging the outer periphery of the pipe. Alternatively the gasket may be placed in an opening which is cored or otherwise formed in a cast member, the gasket having a portion extending into the formed opening and held therein by means of an expansion type clamping band. This type of mounting of a gasket in an opening in a cast member is referred to as being "jacked-in" an opening.

A liquid-tight seal is provided by causing the pipe engaging portion of the gasket to undergo stretching when the pipe is pushed through the gasket or, alternatively, the liquid-tight seal is obtained by placing a clamping band about the pipe engaging portion so as not to rely exclusively upon the stretched gasket absent a clamping band for a liquid-tight seal.

All gaskets presently available provide an adequate liquid-tight seal with cylindrical pipe having a smooth outer periphery. However, pipe having an undulating periphery presents unique problems making it difficult to obtain an adequate liquid-tight seal employing presently available gaskets.

Pipe having a smooth, cylindrical-shaped outer periphery, and typically cast from concrete, are rapidly being replaced for use in underground sewage systems and the like by plastic pipe, which provides more than adequate structural strength while significantly reducing the cost and weight of such pipe as compared with concrete pipe, thereby significantly reducing fabrication, handling, transportation and installation costs.

To obtain plastic pipe of the desired structural strength, some plastic pipe is formed to have a corrugated outer-peripheral shape defined by alternating, annular shaped recesses and projections each recess and projection having a substantially U-shaped cross-section. The interior of the pipe is provided with a smooth, cylindrical-shaped inner periphery integrally joined to the base of each annular recess, which pipe structure yields a pipe of light weight and get significantly large structural strength.

Corrugated pipe of the type described here in above, due to their method off fabrication, are often provided with vent tubes which project radially outward and into each annular recess, said projections lying along an imaginary line parallel to a longitudinal central axis of the pipe at "12 o'clock and "6 o'clock" and extending in an outward radial direction from the cylindrical interior portion.

In order to provide a water-tight seal, the pipe engaging portion of the gasket encircles and engages the outer periphery of the corrugated pipe. Due to the configuration of the corrugated pipe, it is impractical, if not impossible, to obtain a water-tight seal employing only a resilient gasket, i.e., employing a gasket absent a clamping band.

One technique for providing a water-tight seal is to mount a pipe adapter upon the corrugated pipe by stretching the pipe adapter until it is positioned in the proper location, encircling one of the annular projections. The end of the gasket to be water-tightly sealed to the pipe is then pulled over the adapter. A clamping band is placed over the gasket and then tightened. Placement of the take down clamp is critical, if it is not placed properly, failure can occur, in particular if the clamp straddles the pipe and adapter, unequal compression can be the result.

This design has the disadvantage of providing rubber to rubber contact between the adapter and the gasket causing undesirable kinking when the clamping band is tightened which ultimately results in the failure to provide a water-tight seal. In addition, the installation is both tedious and complicated, due to the necessity of significant exertion for stretching the adapter or, to state it in another way, it is tedious and difficult to mount the adapter and push the corrugated pipe through the gasket.

It is therefore desirable to provide a gasket and clamping assembly which is easy to apply, especially one capable of insertion of the corrugated pipe into the gasket without undue exertion yet one which provides an excellent liquid-tight seal between the corrugated pipe and the gasket.

The present invention is characterized by comprising, in one embodiment thereof, a gasket having an inner diameter which is greater than the outer diameter of the corrugated pipe to facilitate easy insertion of the corrugated pipe into the gasket without any exertion whatsoever.

The gasket, in one embodiment, is provided with an which is embedment portion embedded into the cast member during the casting operation and having an annular pipe engaging portion connected to the embedment portion by an annular curved or "radius" portion. The gasket, in another embodiment, is modified so that the portion inserted into periphery of and engaging at a previously formed opening in a cast member has no embedment portion, and in place thereof, is provided with a substantially cylindrical-shaped outer surface for engaging the opening and an inner periphery provided with an annular recess for receiving and aligning an expansion-type clamping band which is expanded in circumference to press the opening engaging portion into firm, liquid-tight engagement with the opening into the cast member. The gasket is placed under compression between the expansion type clamping band and the opening in the cast member sufficient to retain the liquid-tight seal.

The pipe engaging portion is provided with a pair of integral projections about the outer periphery thereof, defining a recess for receiving and aligning a clamping band.

In one embodiment, the recess receiving the clamping band is positioned about an annual recess in the corrugated pipe. The clamping band, when tightened, has a width which is selected to cause the pipe engaging portion of the gasket to form an excellent liquid-tight seal with opposite sides of the annular recess while at the same time being prevented from reaching and engaging the base of the annular recess to prevent engagement of the gasket with a possible vent tube projection formed in the corrugated pipe during fabrication thereof.

In one preferred embodiment, the outer periphery of the pipe engaging portion is provided with integral, spaced parallel projections which define an annular recess for receiving and positioning an adjustable clamping band. The clamping band has a width relative to an annular recess within the corrugated pipe designed to urge the pipe engaging portion into the annular recess and to form a liquid-tight seal between opposite annular sides of the clamping band and the pipe engaging portion which is urged against opposite tapering sides of the annular recess. The adjustable clamping band is tightened sufficiently to assure a liquid-tight seal while preventing the gasket from engaging the base of the annular recess to prevent the portion of the gasket within the annular recess from forming an irregular shape and kinking which would otherwise diminish the assurance of a liquid-tight seal.

The pipe engaging portion which is urged into the annular recess cooperates with the annular recess to form an annular pocket which acts to further enhance the liquid-tight seal as a result of the air compressed within this annular pocket.

The clamping band may assume any one of a variety of different designs including one in which the clamping band is of the type having a threaded member which cooperates with recesses of the clamping band to tighten the clamping band when the threaded member is rotated in a given direction. As another alternative design, the clamping band may be of the type having one or more clamping levers which, when rotated from the open to the closed position, draws the clamping band more tightly about the gasket.

The gasket and clamping band are designed to accommodate corrugated pipe over a wide of range inner diameters.

In one embodiment, the clamping band may be fitted within an annular-shaped saddle having a recess about its outer periphery for receiving the clamping band. The opposite annular sides of the saddle which have a width greater than the width of the clamping band are designed to adapt the gasket for use with corrugated pipe of larger diameters without changing the width of the clamping band. Alternatively, both the clamping band and the saddle may be of increasing width to accommodate corrugated pipe of increasing inner diameter.

The clamping band may also be placed within a recess of the pipe engaging portion which is aligned with an annular peak of the corrugated pipe. In this embodiment, the clamping band may be provided with an inner periphery of a concave shape which generally conforms to the shape of the annular peak. The clamping band is tightened sufficiently to provide a liquid-tight seal.

Two clamping bands may be provided in still another embodiment and both of the clamping bands urge spaced portions of the pipe engaging portion into spaced apart annular recesses. Alternatively, one of the clamping bands may urge one portion of the pipe engaging portion against an annular peak while the other clamping band urges another portion of the pipe engaging portion into an annular recess spaced therefrom.

The gasket is preferably extruded so as to have a cross-section which is substantially the same as the cross-section assumed by the gasket when in the position in which the embedment portion is embedded within the cast member and the pipe engaging portion is clamped to a corrugated pipe. A gasket of this type which is installed into a pre-formed opening, is extruded in a similar fashion but with the embedment portion being eliminated and replaced by a substantially cylindrical-shaped outer surface and an annular recess provided in its inner periphery for receiving an expansion type clamping band.

During casting employing a gasket having an embedment portion, the pipe engaging portion of the gasket inserted into the embedment portion is pulled out so as to substantially define an elongated cylinder together with the embedment portion, the gasket being maintained in this position by mounting upon a one-piece, hole former mandrel.

The hole former mandrel is placed between inner and outer mold members. The casting material is then placed within the mold assembly causing the embedment portion to be embedded within the cast material. The radius portion is in the shape of an annular "hump" when placed upon the hole former. In the case of the gasket inserted into a performed opening in a cast member, the gasket is not placed in the mold assembly but is installed in a performed or "cored" opening.

After the cast member having a gasket embedded therein is stripped from the mold assembly, the gasket is pulled through the embedment portion to assume the pipe connection position. The "humped" radius portion, which provides the gasket with a "memory," causes the gasket to snap into the final use position (which is the same position as when the gasket is extruded) due to the memory of the gasket.

The gaskets of the present invention, may be produced either through the use of a molding or an extruding operation. A gasket, in one preferred embodiment, has a generally annular shape comprised of an outer embedment portion and an inner pipe engaging portion and an intermediate radius portion of substantially U-shaped cross-section joining the embedment and pipe engaging portions, the inner (pipe engaging) portion being rolled outward or rotated into the outer (embedment) portion so that its free end extends beyond the free end of the outer portion before being placed on a hole former mandrel preparatory to a casting operation. This orientation of the gasket is the same orientation as the orientation of the gasket when extruded, for example.

The outer, embedment portion has a radially outwardly extending projection adapted to be embedded within the cast material and having a cross-section which enhances the anchoring of the embedment portion within the cast member.

The pipe engaging portion has a recess on its outer periphery for receiving and positioning a clamping band.

During casting, the inner portion is pulled out of the embedment portion through the use of a hole former, for example, so as to generally define an extended annular portion extending beyond and away from the outer embedment portion. This state is retained by pulling the gasket over the hole forming mandrel.

The hole forming mandrel is mounted in any conventional manner between a jacket and a core of a molding assembly. Although the inner and outer portions of the gasket retain a substantially cylindrical shape, the intervening radius portion forms a "hump" which extends radially away from the hole forming mandrel.

In applications where gaskets are employed in openings of cast members having curved walls, such as manhole bases or the like, the gasket is held in place by two-piece mandrel assemblies such as the type described in co-pending application Ser. No. 09/533,424 filed Mar. 22, 2000 and specifically shown in FIG. 1 thereof. The embedment portion of the gasket is held between the inner and outer mandrel members, which are then secured to one another to hold the gasket in place. The mandrel assembly, with the gasket fixed in place, is then secured between inner core and outer jacket mold members employed to form the cast member, i.e. manhole base. In instances where the size of the opening requires that the gasket have a curvature in the horizontal plane, to generally conform to the curvature of the cored wall (or performed opening), the two-piece mandrel assembly is provided with a curved shape to impart some curvature to the embedment portion of the gasket.

After casting of the cast member (which may typically be a manhole base), the configuration of the gasket in the assembled position provides a large tolerance for the annular space between the inside opening of the entry hole and the outside diameter of the pipe. The radius portion, having a substantially U-shaped cross-section, provides a wide tolerance for annular deflection of the pipe as well as substantial offset placement of the pipe away from both the vertical and horizontal positions, the diameter of which is capable of being adjusted in addition to and independently of gasket thickness. The "rolling" nature of the gasket when in the fully installed position enables the pipe and gasket to change their alignment due to settlement of the ground surrounding the cast member and pipe while assuring and retaining a rugged, liquid-tight seal.

It is therefore one object of the present invention to provide a novel method and apparatus for producing gaskets and for casting gaskets within an opening in cast members, the gasket being designed to receive a corrugated pipe which is easily pushed into the gasket without exertion by providing a inner diameter of the pipe engaging portion which is larger than the outer diameter of the pipe and utilizing clamping means to clamp the pipe engaging portion to an annular projection and/or annular recess to provide an excellent liquid-tight seal therebetween.

BRIEF DESCRIPTION OF THE DRAWINGS

The above is as well as other objects of the present invention will become apparent when reading the accompanying description and drawings in which:

FIGS. 1 and 1a respectively show cross-sections of two gasket embodiments designed in accordance the principles of the present invention.

FIGS. 2e, 2f, 2g and 2h are views similar to those respectively shown in FIGS. 2a, 2b, 2c and 2d and are useful in describing the embodiment of FIG. 1a.

FIG. 3a shows another embodiment of the present invention and

FIG. 3b shows an enlarged portion thereof.

FIG. 4a shows still another embodiment of the present invention and

FIG. 4b shows an enlarged view of the portion of the embodiment of FIG. 4a.

FIG. 5a shows still another embodiment of the present invention and

FIG. 5b shows an enlarged view of a portion of the embodiment of FIG. 5a.

FIGS. 6 and 6a show sectional views of two types of clamp saddles which are employed with the gasket of the present invention.

DETAILED DESCRIPTION OF THE PREFERRED EMBODIMENT

Figure 1:
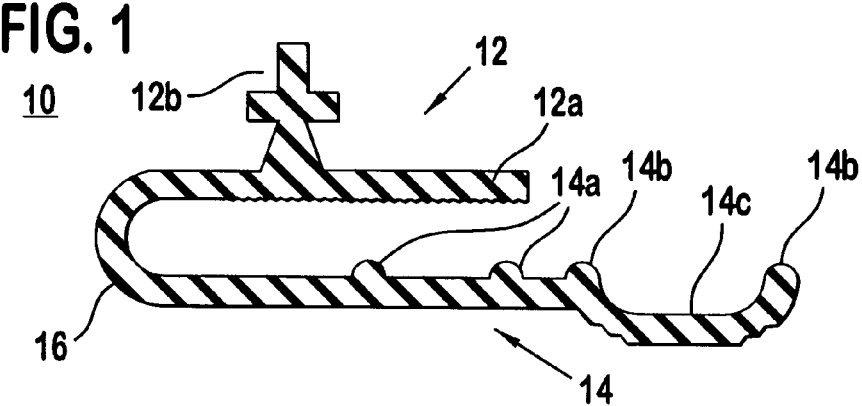

FIG. 1 shows a cross-section of a gasket 10 designed in accordance with the principles of the present invention, this cross-sectional view being taken along a diameter at the gasket. Gasket 10 has an embedment portion 12 including an outer annular-shaped portion 12a and a radially extending projecting portion 12b having a cross-like shape.

An inner annular portion 14 has a first pair of annular projections 14a, a second pair of annular projections 14b and a somewhat concaved shaped recess 14c arranged between the pair of projections 14b.

A hinge portion 16 is integrally joined to the inner and outer portions 12 and 14 and has a substantially U-shaped cross-section.

The gasket is formed of a rubber or rubber-like material having a Durometer sufficient to provide a rugged, resilient, compressable gasket capable of providing excellent water-tight clamping between the gasket and pipe. The Durometer may, for example, be in the 40–45 Durometer range.

The gasket being extruded in the configuration shown in FIG. 1, has a memory, causing the gasket to retain its shape, especially when the extruded member is cut to length and bent to form an annular configuration in order to join the free ends to one another by any suitable fusion or vulcanizing operation, for example.

Figure 2A:
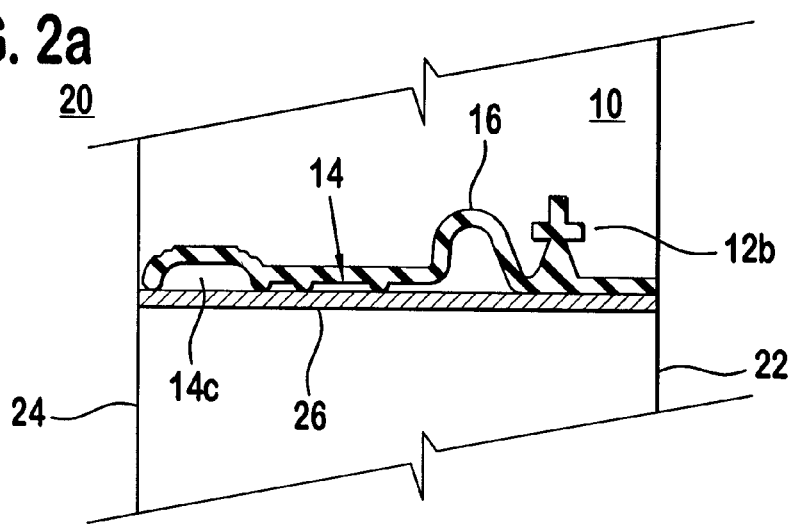
FIGS. 2a and 2b are developmental sectional views respectively showing the manner in which the gasket is embedded during a casting operation and the manner in which the gasket is joined to a corrugated pipe.

FIG. 2a shows the manner in which the gasket is secured within an opening of a cast member. A mold assembly 20 comprised of an outerjacket 22 and an inner core 24, both of which are shown in a simplified fashion, receives a standard knockout hole former 26 of substantially hollow cylindrical shape. Prior thereto, the gasket 10 is pulled over the hole former which gasket is caused to assume the shape shown in FIG. 2a.

With the mold assembly now fully assembled, the cast material, typically concrete, is poured into the mold assembly. The mold assembly is agitated to assure that the concrete makes intimate engagement with the exposed surface areas of the jacket 22, core 24 and gasket 10. It should be noted that, in addition to the radial portion of the extending into the concrete, the radius portion 16 forms an annular "hump" which extends into the concrete. A second annular "hump" of much reduced profile is defined by the portion of the gasket having clamping band receiving recess 14C. which reduced profile "hump" also extends radially outwardly and into the concrete.

After the concrete is set, the cast member 28 (see FIG. 2b) has the mold assembly, including the hole former 26, stripped therefrom.

Figure 2B:
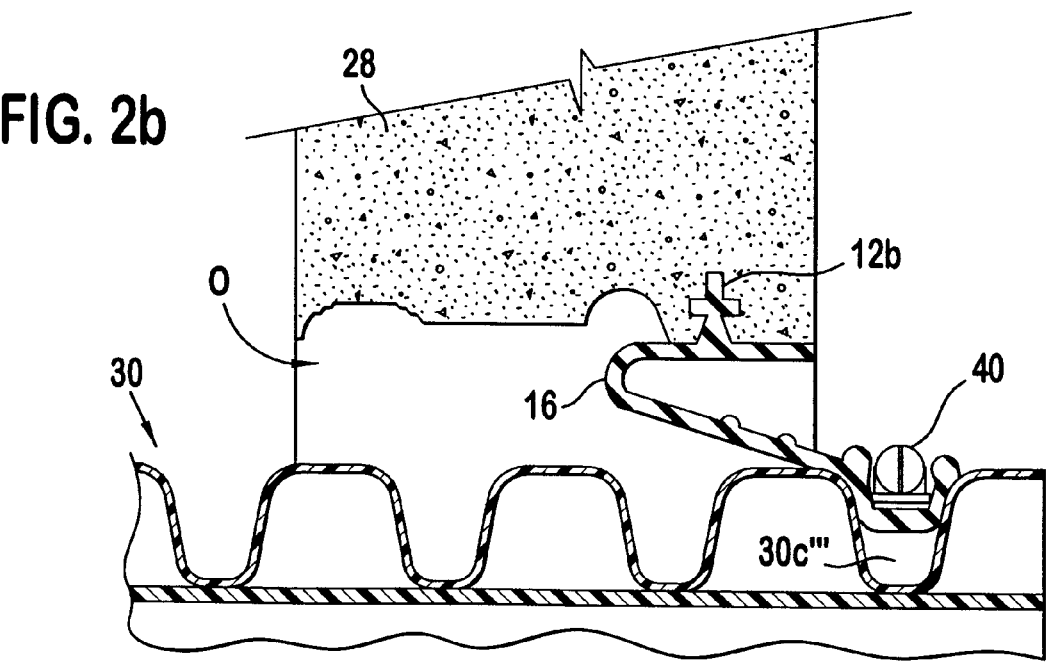

The pipe engaging portion 14 is rotated under and pulled through the pipe embedment portion 12a in the manner shown in FIG. 2b. The radius portion 16, due to its memory characteristic, assists the pulling of the pipe engaging portion through the pipe embedment portion 12a, and in fact, causing the pipe engaging portion to snap into the position substantially as shown in FIG. 2b.

The first and second projection pairs 14a and 14b separate a significant surface portion of the inner periphery of gasket 10 facing hole former 26, thereby reducing the frictional forces which would otherwise act against the pulling of the gasket over the hole former.

Figure 7:
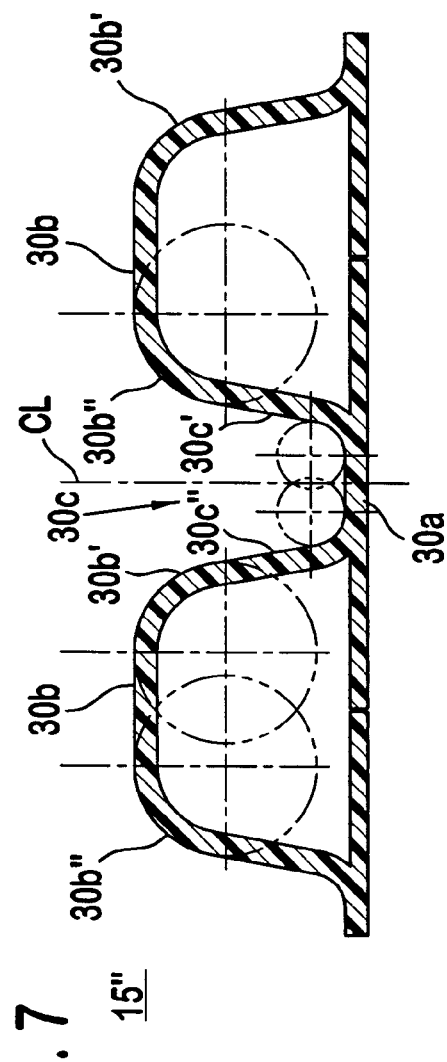
FIGS. 7, 8 and 9 show cross-sectional views of portions of corrugated pipe respectively having inner diameters of 15, 30 and 42 inches.

As was described herein above, the gasket of the present invention is extremely advantageous for use in providing a liquid-tight seal between cast members and corrugated pipe. FIG. 7 shows a cross-section of a portion of the corrugated pipe 30 which is comprised of an inner cylindrical member 30a having alternating annular projections 30b, and intervening annular recesses 30c, the cylindrical member forming closed annular spaces together with each annular projection 30d.

The base of each annular recess 30c forms a thicker wall portion $30a^1$ with the inner cylindrical member $30a^1$. The side portions $30b^1$ and $30b^{11}$ have constant radii of curvature in the region where they join together with the sides $30c^1$, $30c^{11}$ of the adjacent recesses. The face of the recess curves upwardly to meet the tapered sides $30c^1$ and $30c^{11}$ and likewise have a constant radius of curvature. The alignment of the tapers of the sides $30c^1$, $30c^{11}$ are precise, as well as the spacing therebetween, relative to a vertical center line CL.

Figure 8:
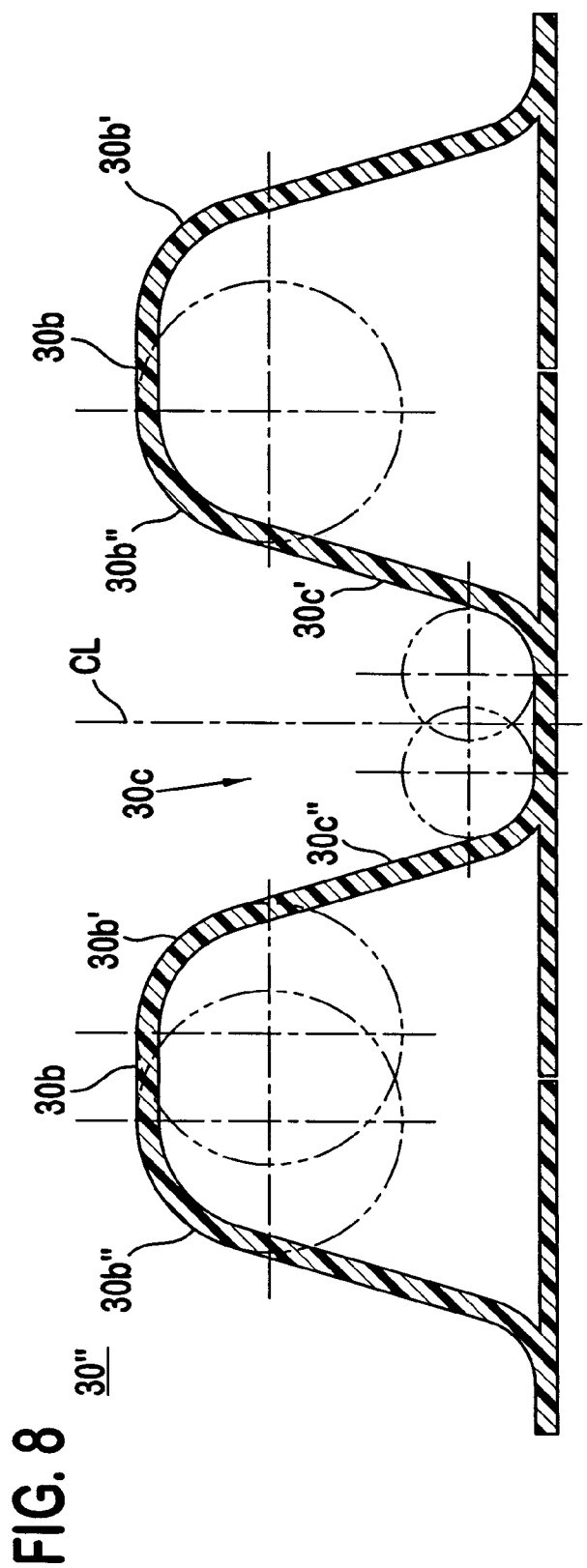
Figure 9:
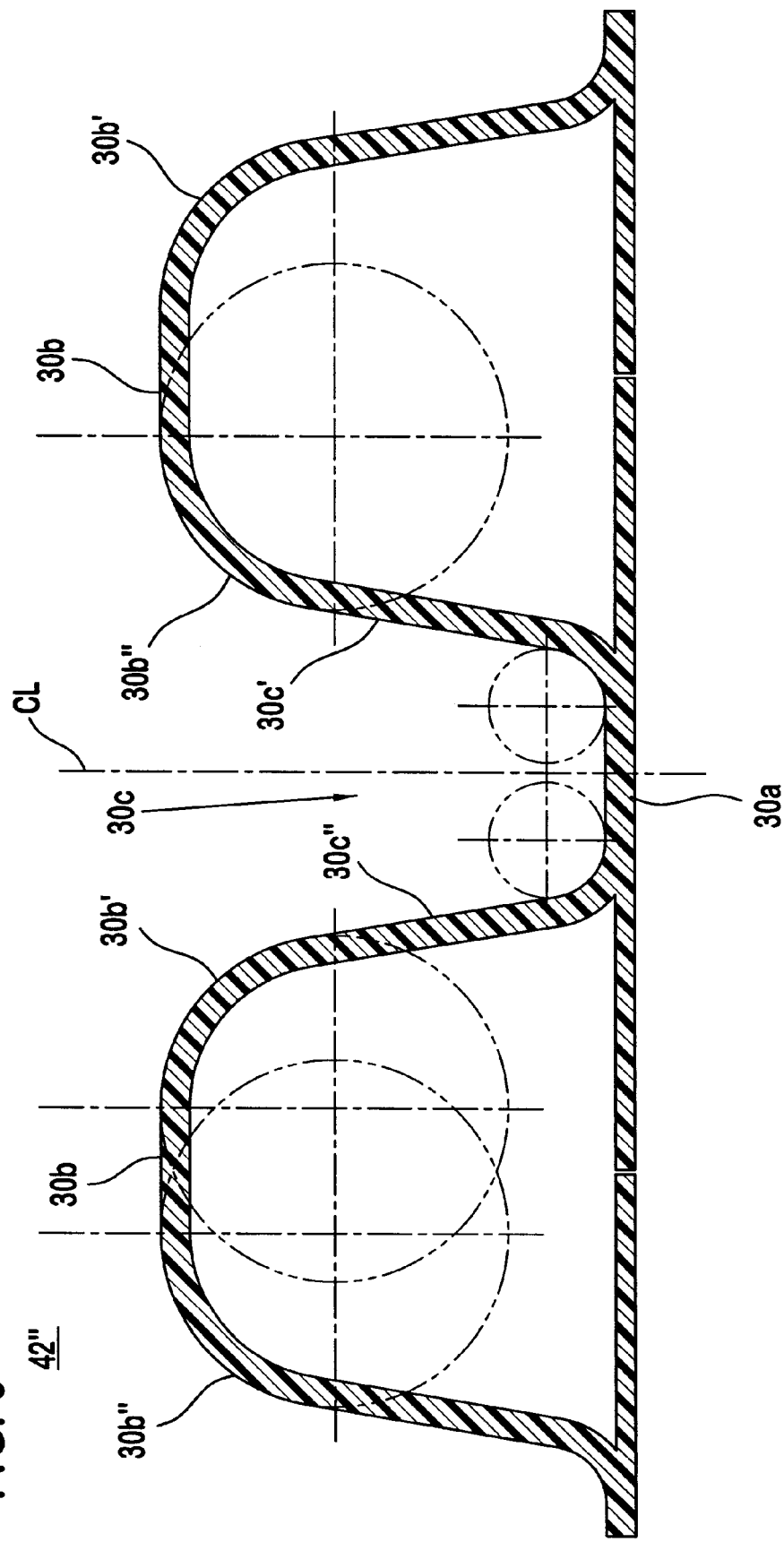

The cross-section shown in FIG. 7 is for a corrugated pipe having a cylindrical portion 30A and an inner diameter of 15 inches. FIGS. 8 and 9 respectively show the cross-section for 30 inch and 42 inch pipe wherein the constant radii of curvature are substantially the same as in the 15 inch pipe, the only difference being an increase in radius.

The gasket is joined to the corrugated pipe by passing the corrugated pipe through the pipe engaging portion, the corrugated pipe being moved into the manhole opening O and through the gasket by moving the pipe from left to right. Although not shown in FIG. 2b, the gasket normally assumes the position shown in FIG. 1. The inner diameter of the pipe engaging portion 14 is preferably slightly greater than the outer diameter of the annular projections 30b, and within a range of 0.25–0.75 inches and preferably 0.25–0.50 inches greater, enabling the corrugated pipe to be quickly and easily pushed through the gasket. The pipe and gasket are aligned relative to one another so that the recess 14c is positioned over annular recess $30c^{11}$ in pipe 30.

Figure 2C:
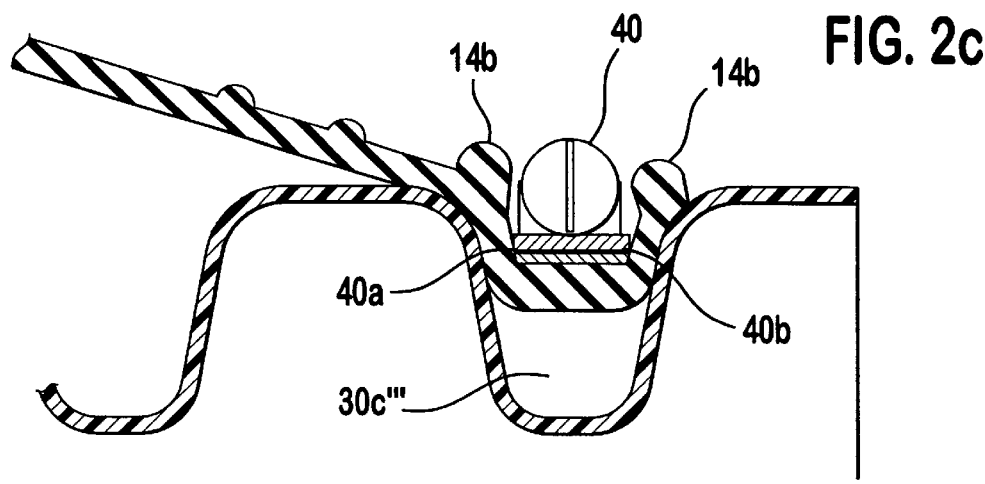
FIG. 2c show an enlarged view of a portion of the gasket pipe and clamping band of FIG. 2b.

A take-down clamp 40 which may be formed of either stainless steel or plastic is placed within recess 14c. The clamp is tightened, causing the gasket to be pushed against and compressed between the sidewalls $30c^{1'}$, $30c^{11}$ at the annular sides of the clamping band. The width of the clamping band 40 and the thickness of the gasket in the region of recess 14c are chosen so as to press the gasket against the sidewalls $30c^{1'}$, $30c^{11}$ as shown in FIGS. 2b and 2c to form an excellent water-tight seal without having to press the gasket radially inwardly so that it engages and compresses against the base of recess $30^{111}$.

Plastic corrugated pipe may have vent tubes at two locations along the base of each annular recess 30c. All of the projections in the annular recesses lie along common, imaginary, straight lines at "12 o'clock" and "6 o'clock" which are parallel to the longitudinal central axis of the pipe. Drawing the pipe engaging portion of the gasket deeply into the annular recesses so as to touch or engage the base of the annular recess will result in kinking or bunching of the gasket, destroying or significantly reducing the required liquid-tight seal. By compressing the gasket between the annular sides of the clamping band and the tapering sides of the annular recess at a spaced position above the base of the recess, an excellent liquid-tight seal is obtained while avoiding kinking or bunching which would otherwise occur by forcing the gasket into the base of the recess.

In addition to the above, the annular pocket of air captured by the gasket when the clamping band is adequately tightened, serves as a means to farther enhance the liquid-tight seal by acting against the inner forces of the clamping band and gasket to firmly maintain the gasket in intimate engagement with the tapered sidewalls of the corrugated pipe.

Figure 2D:
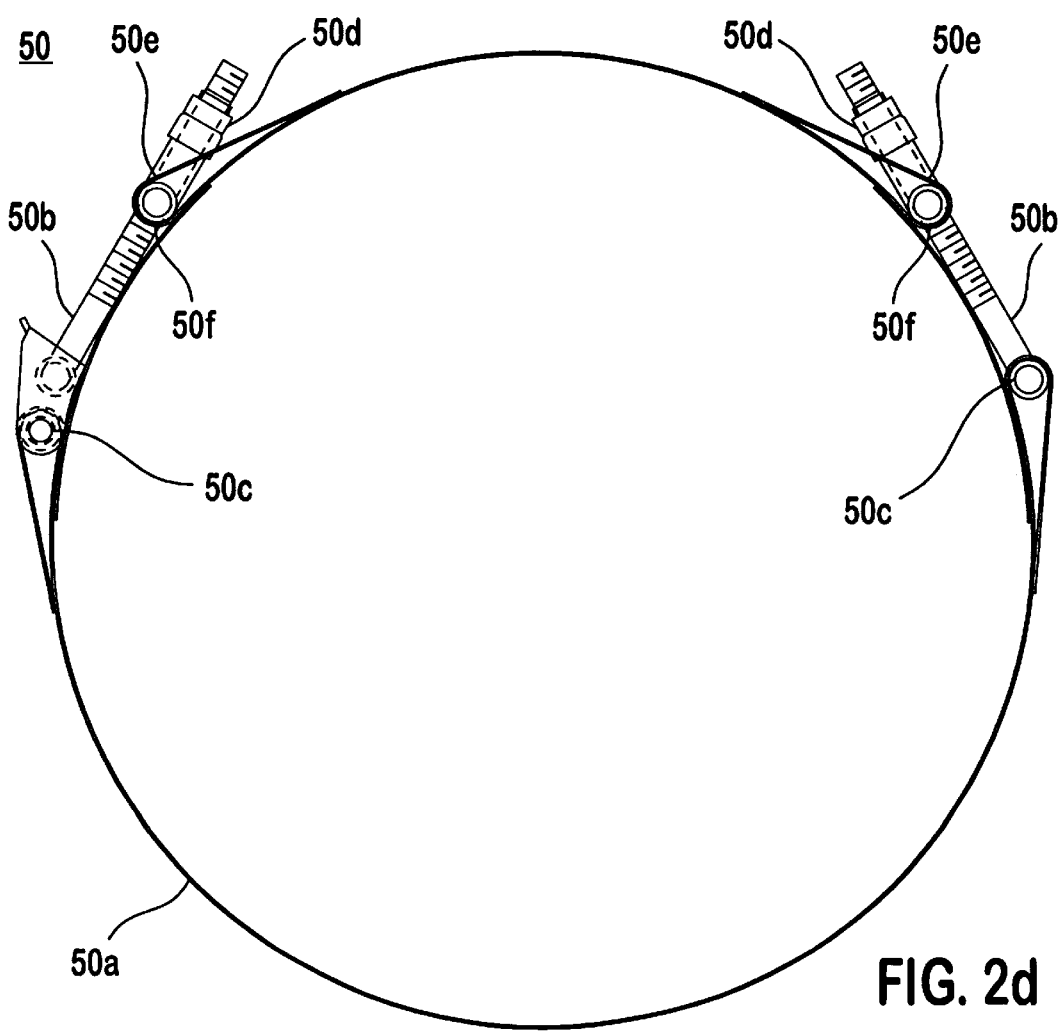
FIG. 2d shows a clamping band which may be advantageously employed with the gasket of the present invention.

The clamping band which is utilized may be any of the conventional clamping bands presently in use such as a radiator gasket type with a worm gear or other threaded member. Alternatively, the turn down clamp may be used having one, two or more takedown clamps portions. The use of such clamps having two takedowns reduces the likelihood of kinking of the gasket in one such embodiment the takedowns are 120 degrees apart before being closed on when tightened and approach an angular separation of 90 degrees. FIG. 2d shows such a clamping band 50 comprised of a band portion 50a. Two T-shaped threaded members 50b each have the head of the T-shaped portion 50c arranged within an associated loop 50c of the band 50a. Threaded nuts 50e each threadedly engage one of the elongated threaded members 50b and each has a pair of arms arranged in associated ones of the loops 50f of band 50. By tightening (rotating) the nuts 50e, the loops 50f—50f each move toward a respective one of the loops 50c—50c to tighten the clamping band. The loops 50c, 50c are approximately 120° apart when the clamping band is loosened and move to positions about 90° apart when tightened.

The width of the band provides maximum pressure over the entire sealing area. The take up nuts are preferably located at "10 o'clock" and "2 o'clock" positions when initially inserted into the gasket to provide easy access during tightening and are adapted to be easily maintained once they are installed.

The linkages are heavy duty to provide durable integrity and positive pressure around the entire band. Bands of this type are capable of being torqued to 250 inch/pounds and the double clamping arrangement acts to prevent kinking. In some applications it is possible to use as few as one takedown clamp or more then two takedown clamps.

The annular sides 40a, 40b of the clamping band are preferably rounded to prevent the band from cutting or damaging the gasket. Although the band shown FIGS. 2B and 2C is substantially flat in cross-section, the band can have a substantially U-shaped cross-section to form a convex surface which engages the surface of the gasket. Alternatively, the clamping band may be a barrel type clamp.

FIG. 1a shows a modification of gasket 12 in FIG. 1. The embodiment $12^1$ shown in FIG. 1a is substantially identical to the gasket 12 except that the pipe engaging portion thereof is extruded so as to be provided with an upturned free end $14b^{11}$, the remaining like elements in both figures being designated by like numerals.

FIG. 2e shows the gasket $12^1$ mounted upon a standard wedge knockout hole former similar to that shown in FIG. 2a. The end $14b^{11}$ is rolled under so as to rest against the outer periphery of hole former 26. The gasket $12^1$ is embedded into the cast member in like fashion to the gasket described in connection with FIG. 2a.

Once the cast member is set, the mold members and hole former are stripped from the cast member. The pipe engaging portion is pulled through the embedment portion to the pipe to manhole connection position shown in FIG. 2f which is similar to that shown in FIG. 2b and is the same as the extruded position shown in FIG. 1a. The corrugated pipe is pushed though the gasket and positioned so that the recess 14a is aligned with a U-shaped recess in the corrugated pipe, as shown. The radially outwardly extending free end or flange $14b^{11}$ eliminates improper alignment of the clamp receiving recess 14c by providing significantly increased visibility of the U-shaped annular recess in the corrugated pipe.

Figure 2G:
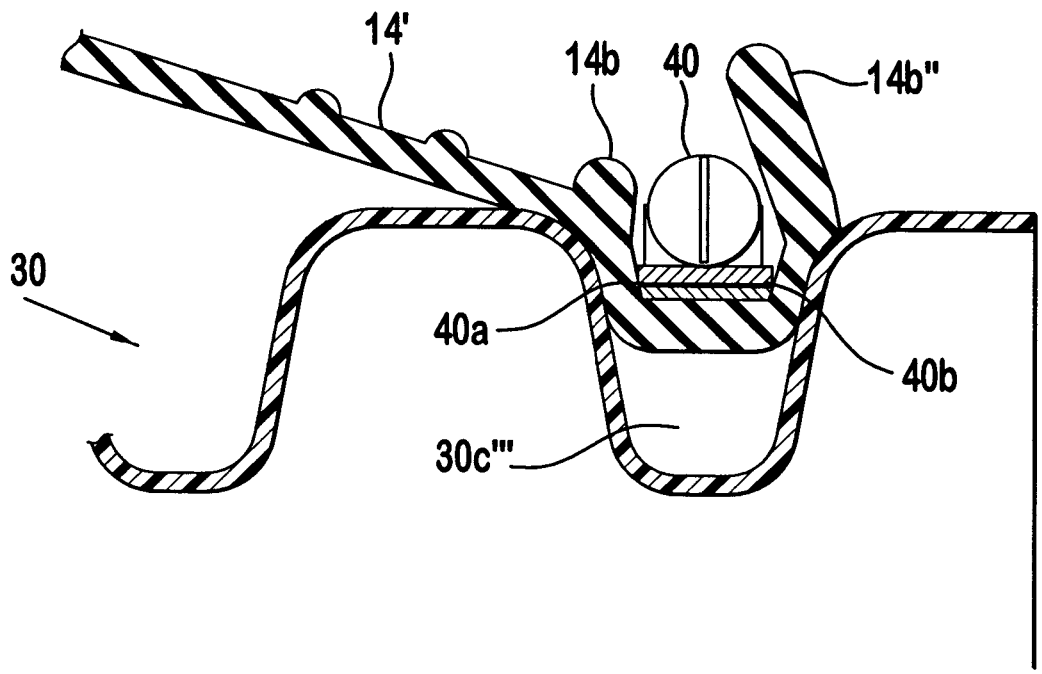

After the pipe 30 is pushed through and properly aligned, a stainless steel or plastic clamp 40 is placed within recess 14c and tightened to compress the gasket into the U-shaped annular recess of the pipe. As the clamp is tightened, the gasket is compressed against the opposing sidewalls of the annular recess in the corrugated pipe 30, as is shown in FIG. 2f and in greater detail in FIG. 2g.

Figure 2H:
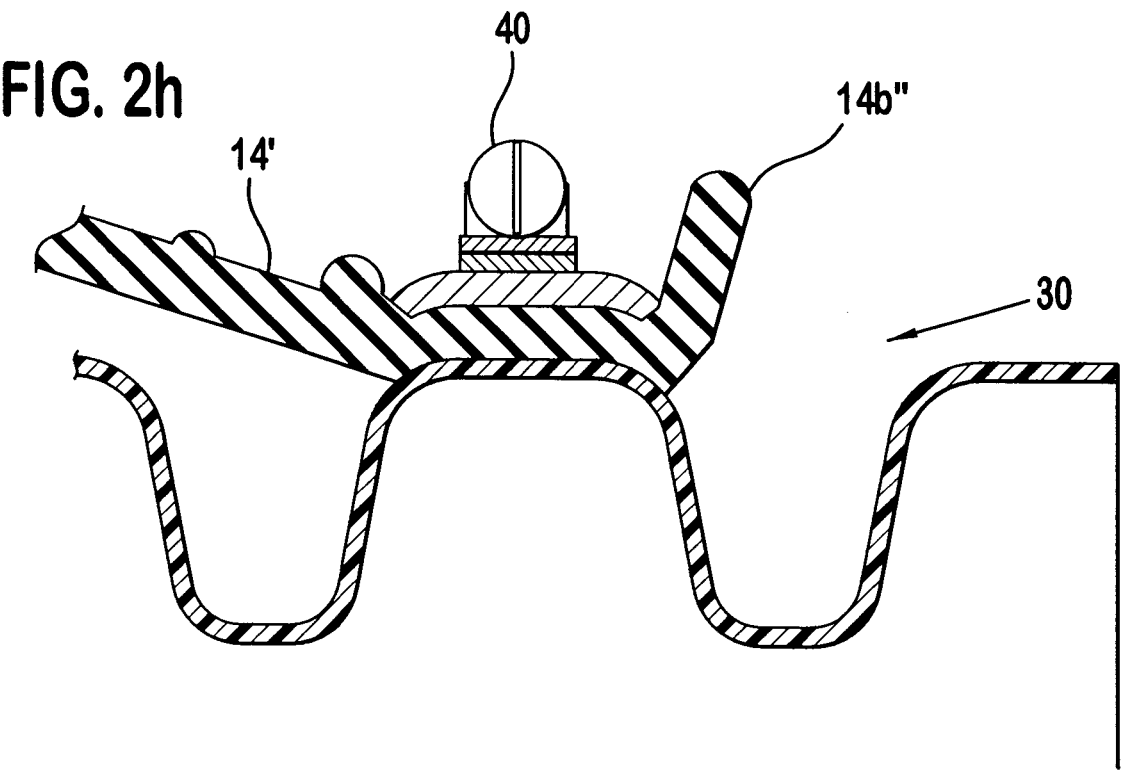

The flange $14b^{11}$ is also effective in simplifying aligning of the gasket recess 14c over an annular peak of the corrugated pipe, as shown in FIG. 2h.

FIGS. 3a through 5b show other preferred embodiments in the present invention.

Making reference to FIG. 3a, the gasket $10^1$, in addition to being provided with projections 14b, includes an additional annular projection $14b^1$ which cooperates with one of the projections 14b to form an annular region for positioning and supporting a second clamping band assembly 42. The clamping band 40 is utilized in substantially the same manner as the clamping band 40 shown in FIGS. 2b and 2c in order to provide a liquid-tight seal between gasket $10^1$ and the tapered sides $30c^1$ and $30c^{11}$ of annular recess 30c.

Clamping band 42 has a band with a substantially C-shaped cross-section to provide a concave surface which engages the gasket $10^1$. The concave surface of the band generally conforms to the shape of the top portion of the annular peak engaged by the gasket.

The clamping bands 40 and 42 are tightened sufficiently to provide liquid-tight seals. If desired, the clamping band 40 may be omitted to provide a single liquid-tight seal provided by the gasket in cooperation with the clamping band 42.

FIGS. 4a and 4b show still another embodiment of the present invention in which gasket $10^{11}$, in addition to the recess 14c and annular projections 14b, is provided with a second recess $14c^1$ and a second pair of annular projections $14b^1$ serving to receive and position a second clamping band 44.

The clamping bands 40 and 44 function in the same manner as the clamping band 40 shown in FIG. 2c to provide liquid-tight seals between the gasket and the sidewalls of the annular recesses 30c, the spacing of the recesses 14c and $14c^1$ being chosen to assure proper alignment with adjacent annular recesses 30c.

If desired, it is also be possible to arrange a clamping band 46 shown in dotted fashion in FIG. 4b, to clamp the gasket against the annular peak 30b.

FIGS. 5a and 5b show still another embodiment of the present invention in which liquid-tight seals are provided between gasket $10^{111}$ and corrugated pipe 30. Gasket $10^{111}$ is provided with first and second spaced parallel projections 14b, $14b^1$ each of which defines an annular region for receiving and positioning a clamping band 42, $42^1$ which clamping bands are of the type shown as the clamping band 42 described herein above in connection with FIGS. 3a and 3b and providing a concave surface which generally conforms to the surface of the annular peaks 30b to assure the provision of a good liquid-tight seal.

FIG. 6 shows a sectional view of a clamp saddle which may be utilized in conjunction with the clamping band. The clamp saddle 50 has a main body portion 50a which curves upwardly at 50b, 50c on opposite sides thereof. The curved portions are joined by inwardly directed flanges 50d, 50e which extend inwardly and are directed toward one another to form a recess for receiving and positioning a clamping band 52 shown in dotted fashion. The clamp saddle serves as a means for utilizing a clamping band which may otherwise be of a width insufficient to provide an adequate liquid-tight seal. For example, the given clamping band may be adequate to provide a liquid-tight seal for a 15 inch corrugated pipe. In order to use the same clamping band with a 24 inch (or larger diameter) corrugated pipe, the clamping band may be inserted into the clamp saddle, which is arranged to form an annular loop which contains the clamping band whereby the curved annular ends 50b and 50c serve as the means for engaging the gasket and pressing the gasket against the tapered sidewalls of an annular recess.

The clamp saddle 54 of the type shown in FIG. 6a may be employed in cooperation with a clamp to provide a seal between a gasket and an annular peak.

FIG. 6a shows another plastic saddle 60 usable with the gasket of the present invention.

Saddle 60 has a main body portion 60a provided with a concave undersurface engaging the gasket in the region between annular projections 14b. The concave surface 60b substantially conforms to the shape of the peak 30b and firmly presses the gasket against peak 30b when clamping band 40 is tightened. Clamping band 40 fits within a recess defined by the upper surface 60c of clamp saddle 60 and beneath the overlying, inwardly directed flanges 60c.

The clamping band 40 rests upon a substantially planar surface 60b, enabling use of a flat clamping band. Alternatively, the recess in the clamp saddle may be curved to accommodate a curved clamping band. The saddle clamp 60 serves the same function as the saddle clamp 50 enabling use of a clamping band of reduced width with a pipe of greater diameter. As an example, a clamping band adapted for use with a 15 inch corrugated pipe may be utilized to clamp a gasket onto a annular peak of corrugated pipe of larger diameter such as 24 inches.

Figure 10:
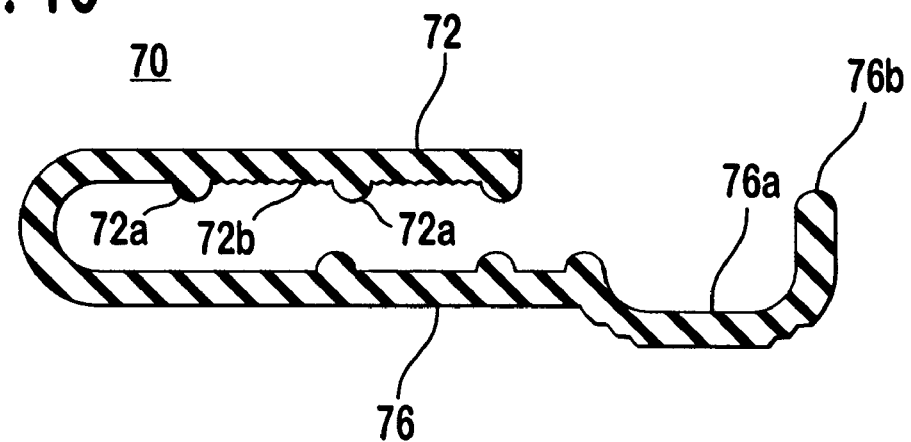
FIG. 10 is a cross-sectional view of still another embodiment of the present invention, showing the manner in which the embodiment is extruded.
Figure 10A:
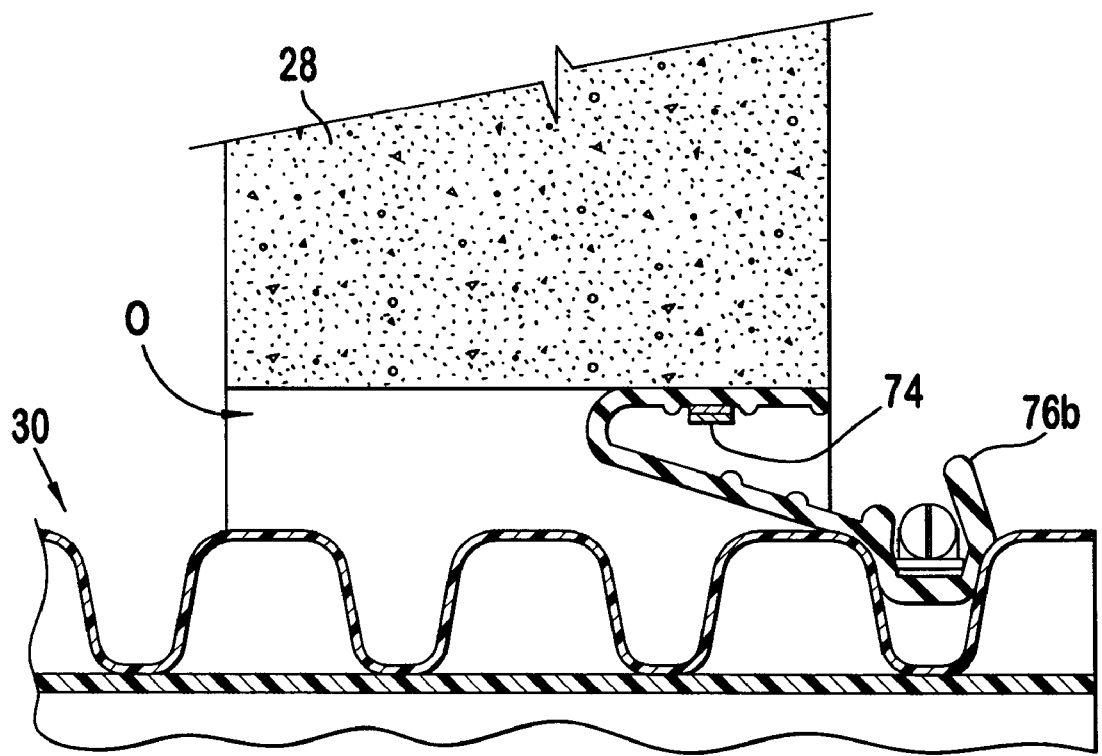
FIG. 10a is a sectional view showing the manner in which the gasket of FIG. 10 is arranged within an opening in a cast member.

FIG. 10 shows a cross section of another embodiment of the present invention which is employed in precast openings of a cast member. The embodiment 70 eliminates the embedment portion provided, for example, in the gasket 12 of FIG. 1. Annular projections 72a are provided along the inner periphery of the portion 72 of the gasket and define a recess 72b. The gasket is inserted into the opening of a cast member as shown in FIG. 10a. An expansion type clamping band 74 is placed against the recess 72b defined by the projections 72a and is expanded to force portion 72 of the gasket 70 against the inner periphery of opening O in cast member 28. The expansion-type clamping assembly is expanded by an amount to compress the gasket between the band 74 and the surface of opening O sufficient to secure a liquid-tight seal.

The pipe engaging portion 76 extends through the portion 72 and the recess 76c is centered over an annular recess in the corrugated pipe as shown in FIG. 10a. A clamping band 78 similar to that shown in FIG. 2f is placed within recess 76a and is tightened to compress the gasket against the sidewalls of the annular recess in the corrugated pipe. The radially outwardly directed annular flange 76b, provided at the free end of the of portion 76 facilitates alignment of the gasket within the annular recess in the corrugated pipe 30 as shown in FIG. 10a. The gasket 70 may also be clamped to an annular peak of the corrugated pipe, as shown in FIG. 2h and provides the same alignment advantages as when mounted in an annular recess.

The gasket 70 and the gasket 12 may also be provided with two pairs of annular projections as shown in FIG. 4b to provide two spaced recesses each receiving a clamping band to force the gasket into two adjacent annular recesses in the corrugated pipe or alternatively to be clamped over a pair of adjacent annular peaks of the corrugated pipe, as shown in FIG. 5b.

The gaskets $12^1$ and 70 may also be employed with the saddles 50 and 60 respectively shown in FIGS. 6 and 6a in applications where such saddles are needed.

Although the preferred embodiments describe the gasket of the present invention as being mounted within a cast member employing a one-piece hole former, the gasket of the present invention may be mounted within cast members through the use of two piece mandrel assemblies which are well known in the art and which provide for a positioning of the gasket as well as forming an opening having a tapering, conical shape which is described in co-pending U.S. patent appln. Ser. No. 09/533,424 filed Mar. 22, 2000 (POL-PT012.1) and specifically FIGS. 1 through 4, which application is incorporated herein by reference thereto.

Figure 11:
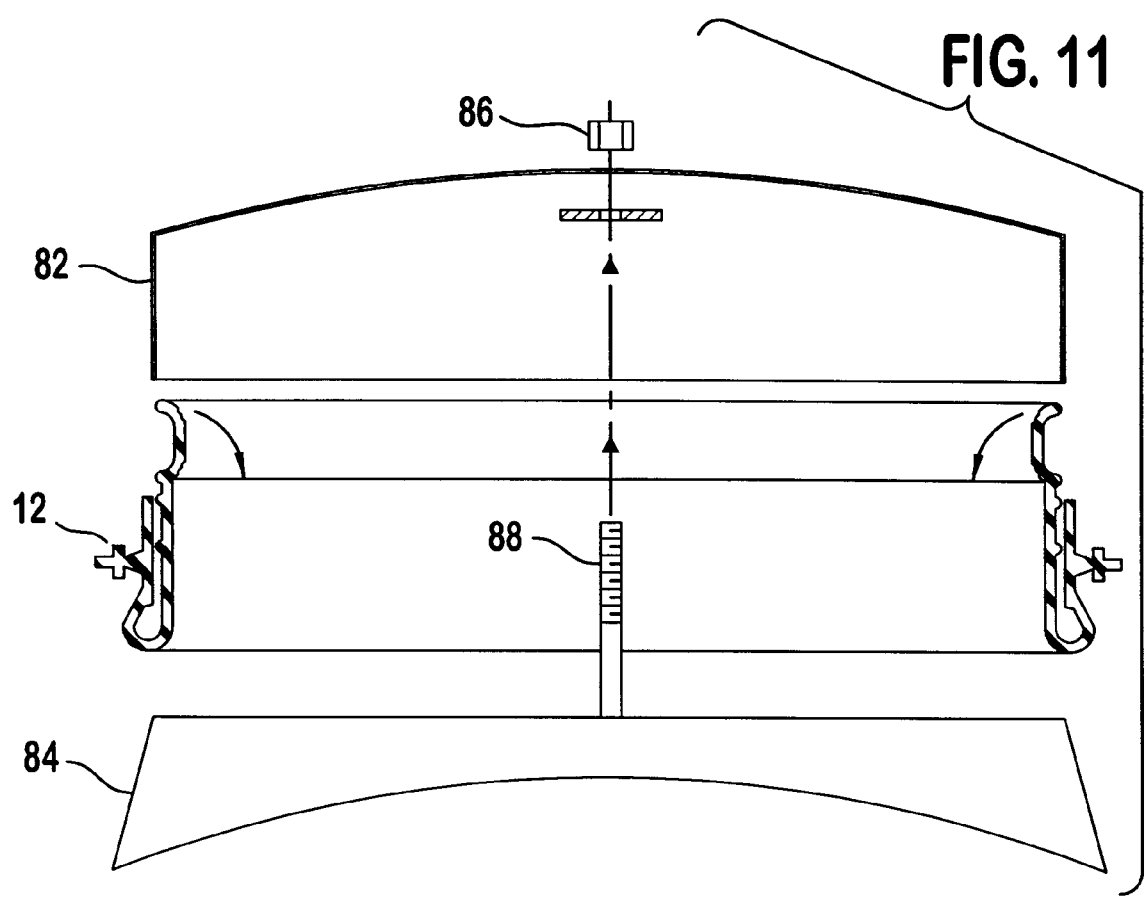
FIG. 11 shows a simplified plan view, partially exploded, of a two-piece mandrel and a gasket of the present invention and which is useful in explaining the installation of the gasket.
Figure 11A:
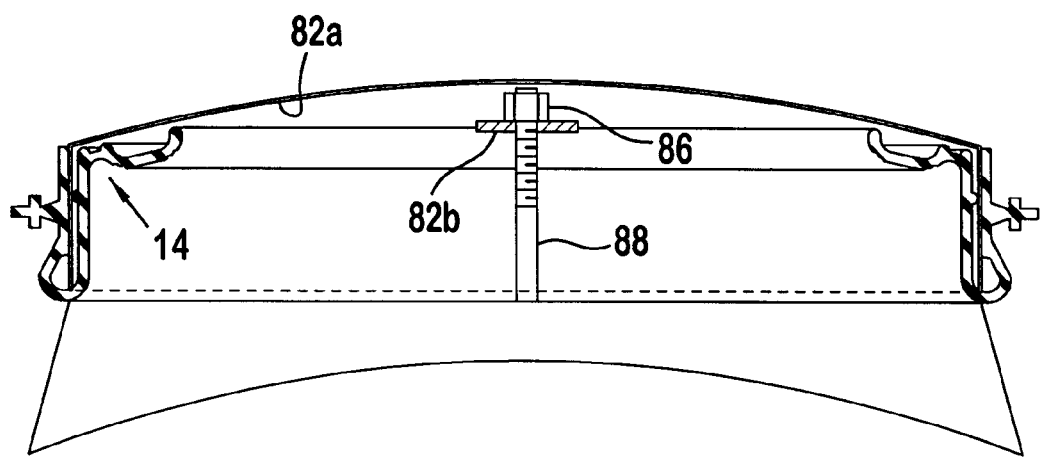
FIG. 11a shows a view of the gasket and two-piece mandrel in the assembled state.
Figure 11B:
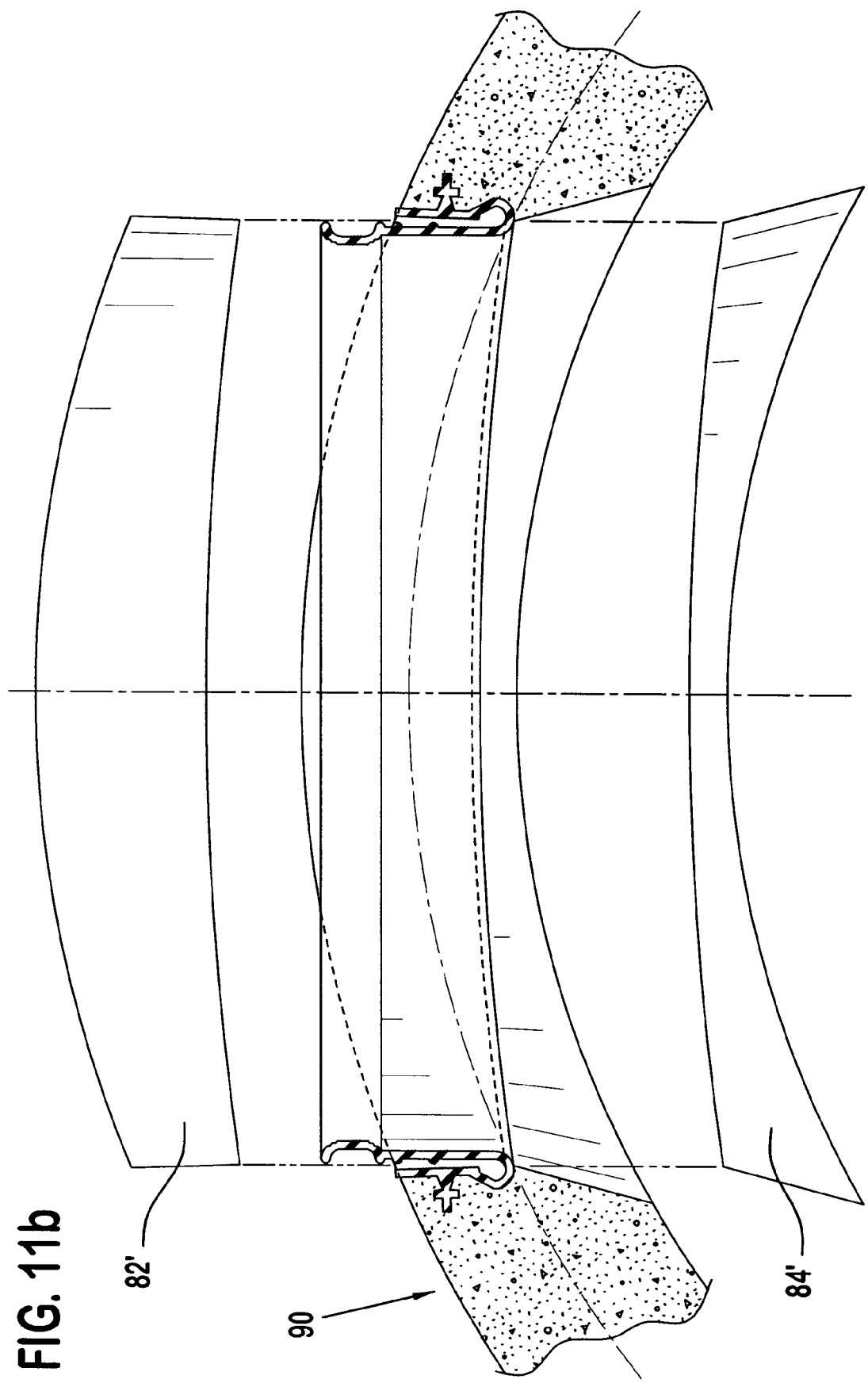
FIG. 11b is a simplified plan view showing a modified two-piece mandrel assembly for imparting a small curvature to the gasket in curved cast members having large diameter openings requiring such a curvature.

FIGS. 11a–11c shows the manner in which the gasket of the present invention is installed employing a two-piece mandrel assembly 82. Initially, gasket 12 is stretched over the outside half of mandrel assembly 80, as shown in FIG. 11. The pipe engaging portion 14 is forced up against the interior wall 82a of inside half 82.

The inside half 84 and outside half 82 are joined together by nut 86 which threadedly engages threaded bolt 88, which is secured to inside half 84 and extends through an opening in a bracket 82b joined to the interior of outside half 82.

The assembly shown in FIG. 11a is arranged within inside (core) and outside (jacket) mold members (not shown) employed to make to cast member. After the cast member is set, the mandrel and mold assemblies are disassembled.

In cylindrical-shaped cast members, such as cast member 90, shown in FIG. 11b, the inside and outside mandrel halves $84^1$ and $82^1$ are provided with a slight radius to accommodate larger diameter gaskets. The gasket has a slight curvature imparted thereto, which is shown in FIG. 11b, which cuts a horizontal plane through the gasket.

Of course, any other hole former assemblies may be utilized.

What is claimed is:

1. A gasket for providing a liquid-tight seal between a pipe having corrugated outer periphery defined by alternating substantially U-shaped peaks and recesses, and an opening in a wall into which said pipe at least partially extends, said gasket comprising;
    a resilient rubber-like, annular-shaped member having an embedment portion for embedment into said opening and a pipe engaging portion encircling and engaging an outer periphery of said pipe;
    a joining portion arranged between and integrally joined to said embedment portion and said pipe engaging portion;
    said embedment portion having a cross-sectional shape to enhance securement of said embedment portion in said sidewalk opening, said embedment portion being joined to said sidewalk during a casting operation;
    said pipe engaging portion being urged into one of said annular-shaped recesses by an adjustable clamping band;
    the thickness of the pipe engaging portion and the width of the clamping band being selected to prevent the gasket from engaging the base of the recess into which the pipe engaging portion is clamped when the clamping band is tightened by an amount sufficient to assure a liquid-tight seal.

2. The gasket of claim 1 wherein said clamping band urges the pipe engaging portion against opposing sidewalls of an annular recess to form liquid tight seals.

3. The gasket of claim 1 wherein pipe engaging portion urged into said annular recess cooperates with the base of the annular recess to form an annular air pocket which cooperates with the tightened clamping band and the pipe engaging portion to enhance the liquid tight seal.

4. The gasket of claim 1 wherein opposite annular sides of said clamping band are provided with smooth, curved surfaces to prevent the sides from cutting into the pipe engaging portion.

5. The gasket of claim 1 wherein said clamping band has a curved inner peripheral convex surface engaging into pipe engaging portion to urge the pipe engaging portion engaged by said clamping band toward the base of said annular recess.

6. The gasket of claim 5 wherein the outer periphery of the pipe engaging portion is provided with integral, first and second annular-shaped, spaced parallel projections defining therebetween a recess for receiving and positioning said clamping band.

7. The gasket of claim 6 wherein the outer periphery of the pipe engaging portion is provided with a additional pair of annular, spaced parallel projections defining therebetween a second recess for receiving and positioning a second clamping band, said addition pair of projections being spaced from the first-mentioned pair of projections to assure that the second clamping member is aligned with an annular recess spaced from the annular recess receiving said first-mentioned clamping member.

8. A gasket for providing a liquid-tight seal between a pipe having a corrugated outer periphery defined by alternating, annular peaks and recesses each having a substantially U-shaped cross-section, and an opening in a sidewalk of a cast member into which said pipe at least partially extends, said gasket comprising:
    a resilient rubber-like annular-shaped member having an embedment portion for embedment into said opening of said cast member and having a shape for securing said embedment portion in said cast member; and an annular-shaped pipe engaging portion encircling the outer periphery of said pipe;
    an outer periphery of said pipe engaging portion having first and second annular recesses thereof each being respectively urged into first and second ones of said annular recesses in said pipe by first and second clamping bands;
    the thickness of the pipe engaging portion and the width of each clamping band being selected to prevent the gasket from engaging each base of the recesses into which the pipe engaging regions are urged while assuring that the clamping bands are tightened sufficiently to assure a liquid-tight seal in each recess.

9. The gasket of claim 8 wherein each of said clamping bands urge the pipe engaging portion against opposing sidewalls of an associated annular recess to form said liquid-tight seals.

10. The gasket of claim 8 wherein pipe engaging portion urged into said annular recesses cooperates with the base of the annular recess to form an annular air pocket which cooperates with the tightened clamping band and the pipe engaging portion to enhance the liquid-tight seal.

11. The gasket of claim 9 wherein opposite annular sides of said clamping band are provided with smooth curved surfaces to prevent the sides from cutting into the pipe engaging portion.

12. The gasket of claim 9 wherein said clamping band has a curved convex surface engaging into pipe engaging portion to urge the pipe engaging portion engaged by said clamping band toward the base of said annular recess.

13. The gasket of claim 8 wherein the outer periphery of said pipe engaging portion is provided with first and second pairs of annular, spaced parallel projections, each pair being on opposite sides of an associated recess for receiving and positioning one of said clamping bands, said pairs being spaced from one another to assure proper alignment with annular recesses in said pipe.

14. A gasket for providing a liquid-tight seal between a corrugated pipe having an outer periphery formed of alternating annular peaks and recesses each having a substantially U-shaped cross section, and an opening in a cast member, said gasket having an embedment portion for embedment in the opening of the cast member and a pipe engaging portion encircling the outer periphery of said pipe;
   said embedment portion having a shape for enhancing securement of said embedment portion in said cast member;
   a clamping band encircling said pipe engaging portion for urging said pipe engaging portion into intimate engagement with one of said annular peaks to provide a liquid-tight seal when said clamping band is tightened.

15. The gasket of claim 14 wherein opposite sides of said clamping band are provided with smooth curved surfaces to prevent the sides from cutting into the pipe engaging portion.

16. The gasket of claim 14 wherein an outer periphery of the pipe engaging portion is provided with first and second annular, shaped parallel projections defining therebetween a recess for receiving and positioning said clamping band.

17. A gasket for providing a liquid-tight seal between a corrugated pipe having an outer periphery formed of alternating annular peaks and recesses each having a substantially U-shaped cross section, and an opening in a cast member, said gasket having an embedment portion for embedment in the opening of the cast member and a pipe engaging portion encircling the outer periphery of said pipe;
   said embedment portion having a shape for enhancing securement of said embedment portion in said cast member;
   a clamping band encircling said pipe engaging portion and having a curved, concave, inner periphery of a shape generally confirming to a cross-sectional shape of an annular peak for urging said pipe engaging portion into intimate engagement with said annular peak to provide a liquid-tight seal when said clamping band is tightened.

18. The gasket of claim 17 wherein said clamping band is tightened sufficiently to cause the annular peak about which the clamping band is encircled to at least partially flatten an outer-most portion of said peak.

19. A gasket according to claim 17 further comprising an annular saddle encircling the annular peak to which said clamping band is applied, said saddle having an outer periphery provided with a recess for receiving and positioning said clamping band and an inner periphery with a recess engaging the annular peak to which the clamping band is clamped.

20. The gasket according to claim 19 wherein the recess in the inner periphery of said saddle has a curved concave surface substantially conforming to the shape of a top portion of the annular peak engaged by said clamping band.

21. The gasket of claim 17 further comprising a second clamping band for urging an annular region of said pipe engaging portion spaced from said first mentioned clamping band for urging said annular region of said pipe engaging portion into intimate contact with another annular peak of said pipe spaced from said first mentioned annular peak engaged by said first mentioned clamping band.

22. A gasket according to claim 21 further comprising a second annular saddle encircling the annular peak to which said second clamping band is applied, said saddle having an outer periphery provided with a recess for receiving and positioning said second clamping band and an inner periphery with a recess engaging the annular peak to which the clamping band is clamped.

23. The gasket according to claim 22 wherein the recess in the inner periphery of said second saddle has a curved concave surface substantially conforming to the shape of a top portion of the annular peak engaged by said clamping band.

24. The gasket of claim 17 further comprising a second clamping band for urging an annular region of said pipe engaging portion into an annular recess spaced from the annular peak engaged by said first mentioned clamping band.

25. The gasket of claim 24 wherein an inner diameter of said pipe engaging portion is greater then an outer diameter of said annular peaks, enabling the pipe to be easily inserted into the pipe engaging portion, engagement of said pipe engaging portion being insufficient to provide a liquid-tight seal therebetween:
   said gasket being sufficiently resilient to enter into said annular recess when the clamping band engaged therewith is tightened to thereby provide a liquid-tight seal between said pipe engaging portion and opposite tapering sides of the annular recess engaged by the pipe engaging portion.

26. The gasket of claim 25 wherein said pipe engaging portion has an inner diameter which enables the pipe to be easily inserted into said pipe engaging portion, engagement between said pipe and said pipe engaging portion being insufficient to provide a liquid-tight seal therebetween;
   said gasket being sufficiently resilient to conform to the shape of the top portion of said annular peak to assure a liquid-tight seal when the clamping band is tightened.

27. The gasket of claim 1 wherein an annular radius portion is integrally joined to and lies between said embedment portion and said pipe engaging portion;
   said radius portion having a curved cross-section for enabling said pipe engaging portion to be maintained in a first condition when extending in a first direction away from said pipe embedment portion during casting and a second stable condition wherein said radius portion is rotated inwardly when said pipe engaging portion is pulled into said embedment portion and extends in a second direction opposite said first direction so that a free end of the pipe engaging portion extends beyond a free end of said embedment portion.

28. A method for providing a liquid-tight seal between an opening in cast member and a corrugated pipe comprising the steps of
a) providing a resilient gasket having an annular embedment portion and an annular pipe engaging portion and an annular radius portion joining said embedment portion to said pipe engaging portion
b) embedding said pipe embedment portion in an opening in said cast member during casting of said cast members;
c) rotating said pipe engaging portion inwardly and into and through said opening, said radius portion acting to stably, maintain the pipe engaging portion in the inwardly rotated position;
d) inserting said corrugated pipe into the pipe engaging portion, said pipe engaging portion having an inner diameter to enable said pipe to be easily pushed into said pipe engaging portion without undue exertion;
e) placing a clamping band in an annular recess provided in an outer periphery of said pipe engaging portion which is aligned with an annular recess in said corrugate pipe;
f) tightening said clamping band to urge said pipe engaging portion into opposite sidewalls of said annular recess to form a liquid-tight annular seal therebetween, said annular seals being positioned about the base of said annular recess.

29. A method for providing a liquid-tight seal between an opening in cast member and a corrugated pipe comprising the steps of
a) providing a resilient gasket having an annular embedment portion and an annular pipe engaging portion and an annular hinge portion joining said embedment portion to said pipe engaging portion
b) embedding said pipe embedment portion in an opening in said cast member during casting of said cast members;
c) rotating said pipe engaging portion inwardly and into and through said opening, said radius portion acting to stably, maintain the pipe engaging portion in the inwardly rotated position;
d) inserting said corrugated pipe into and through the pipe engaging portion, said pipe engaging portion having an inner diameter to enable said pipe to be easily pushed into said pipe engaging portion;
e) placing a clamping band having a curved concave inner periphery about an outer periphery of said pipe engaging portion which is aligned with an annular peak in said corrugated pipe; and
f) tightening said clamping band to urge said pipe engaging portion into firm engagement with said annular peak to form a liquid-tight seal therebetween.

30. The gasket of claim 1 wherein an inner periphery of the pipe engaging portion is greater than an outer diameter of the peaks of the corrugated pipe.

31. The gasket of claim 30 wherein a diameter of said inner periphery is in the range of 0.250 to 0.50 inches greater than the outer diameter of the peaks of said corrugated pipe.

32. The gasket of claim 30 wherein a diameter of said inner periphery is in the range of 0.250 to 0.75 inches greater than the outer diameter of the peaks of said corrugated pipe.

33. A gasket for providing a liquid-tight seal between a pipe having corrugated outer periphery defined by alternating substantially U-shaped peaks and recesses, and an opening in a wall into which said pipe at least partially extends, said gasket comprising;
a resilient rubber-like, annular-shaped member having a portion for insertion into and engagement with said opening and a pipe engaging portion encircling and engaging an outer periphery of said pipe;
a joining portion arranged between and integrally joined to said embedment portion and said pipe engaging portion;
said portion for engaging said opening having an annular recess about its inner periphery for receiving an annular expansion-type clamping band, which, when expanded, secures said portion engaging said wall opening, to provide a liquid-tight seal between said portion engaging the opening in said wall and said opening;
said pipe engaging portion being urged into one of said annular-shaped recesses by an adjustable clamping band;
the thickness of the pipe engaging portion and the width of the clamping band being selected to prevent the gasket from engaging the base of the recess into which the pipe engaging portion is clamped when the clamping band is tightened by an amount sufficient to assure a liquid-tight seal.

34. The gasket of claim 33 wherein said clamping band urges the pipe engaging portion against opposing sidewalls of an annular recess to form liquid tight seals.

35. The gasket of claim 33 wherein the pipe engaging portion urged into said annular recess cooperates with the base of the annular recess to form an annular air pocket which cooperates with the tightened clamping band and the pipe engaging portion to enhance the liquid tight seal.

36. The gasket of claim 33 wherein a free end of the pipe engaging portion of the gasket is provided with an annular, flange which extends radially outward and away from a pipe inserted into said pipe engaging portion to facilitate alignment of the clamping band with a an annular recess of the corrugated pipe.

37. The gasket of claim 33 wherein a free end of the pipe engaging portion of the gasket is provided with an annular, flange which extends radially outward and away from a pipe inserted into said pipe engaging portion to facilitate alignment of the clamping band with an annular peak of the corrugated pipe.

38. The gasket of claim 1 wherein a free end of the pipe engaging portion of the gasket is provided with an annular, flange which extends radially outward and away from a pipe inserted into said pipe engaging portion to facilitate alignment of the clamping band with a an annular recess of the corrugated pipe.

39. The gasket of claim 1 wherein a free end of the pipe engaging portion of the gasket is provided with an annular, flange which extends radially outward and away from a pipe inserted into said pipe engaging portion to facilitate alignment of the clamping band with an annular peak of the corrugated pipe.

* * * * *

UNITED STATES PATENT AND TRADEMARK OFFICE
CERTIFICATE OF CORRECTION

PATENT NO.   : 6,406,025 B1
DATED        : June 18, 2002
INVENTOR(S)  : Westhoff et al.

It is certified that error appears in the above-identified patent and that said Letters Patent is hereby corrected as shown below:

Column 1,
Lines 6, 14, 20 and 21, delete "sidewalk" and insert therefor -- sidewall --.
Line 61, delete "here in above" and insert therefor -- hereinabove --.

Column 4,
Line 67, delete "outerjacket" and insert therefor -- outer jacket --.

Column 6,
Line 50, delete "outerjacket" and insert therefor -- outer jacket --.

Column 7,
Line 16, delete "herein above" and insert therefor -- hereinabove --.

Column 10,
Line 8, delete "hererin above" and insert therefor -- hereinabove --.

Column 12,
Lines 6, 7 and 52, delete "sidewalk" and insert therefor -- sidewall --.

Signed and Sealed this

Twenty-eighth Day of January, 2003

JAMES E. ROGAN
*Director of the United States Patent and Trademark Office*